United States Patent

Ganz et al.

[11] Patent Number: 5,479,557
[45] Date of Patent: Dec. 26, 1995

[54] CIRCUIT ARRANGEMENT FOR POWER SUPPLY OF A FAN AND/OR BATTERY BY SOLAR GENERATOR IN A MOTOR VEHICLE

[75] Inventors: Thomas Ganz, Stockdorf; Robert Watzlewick, Munich, both of Germany

[73] Assignee: Webasto Karosseriesysteme GmbH, Stockdorf, Germany

[21] Appl. No.: 328,003

[22] Filed: Oct. 24, 1994

[51] Int. Cl.⁶ .............................. H02J 7/35; H02M 3/10
[52] U.S. Cl. .................... 388/829; 318/480; 323/234; 320/30; 136/293; 454/900
[58] Field of Search ..................... 318/471, 478, 318/479, 480, 558; 388/825, 907.5, 915, 828, 829; 136/243, 291, 293; 320/5, 9, 30, 31, 32, 33; 323/234, 265, 282, 286, 299, 906; 363/95, 97; 454/129, 900

[56] References Cited

U.S. PATENT DOCUMENTS

| | | |
|---|---|---|
| 3,816,804 | 6/1974 | Cardwell, Jr. . |
| 4,390,940 | 6/1983 | Corbefin et al. . |
| 4,468,569 | 8/1984 | Norris . |
| 4,556,835 | 12/1985 | Vogel et al. . |
| 4,916,382 | 4/1990 | Kent . |
| 5,089,764 | 2/1992 | Bobier et al. . |
| 5,213,626 | 5/1993 | Paetz . |
| 5,248,278 | 9/1993 | Fuerst et al. . |
| 5,270,636 | 12/1993 | Lafferty . |

FOREIGN PATENT DOCUMENTS

| | | |
|---|---|---|
| 0004970 | 4/1979 | European Pat. Off. . |
| 2902683 | 7/1979 | Germany . |
| 4017670 | 6/1990 | Germany . |
| 3938259 | 6/1991 | Germany . |
| 4009871 | 10/1991 | Germany . |
| 4105396 | 9/1992 | Germany . |

OTHER PUBLICATIONS

MPP-Tracking by Peter Adelmann, pp. 9-11 of the Jan., 1988 Sonnenenergie (Solar Energy).

*Primary Examiner*—Bentsu Ro
*Attorney, Agent, or Firm*—Sixbey, Friedman, Leemon & Ferguson; David S. Safran

[57] ABSTRACT

Circuit arrangement for supplying power to a fan and/or battery from solar energy generator in a motor vehicle. A DC voltage converter using impedance matching between the solar energy generator and the fan or the battery includes a switch that is alternately opened and closed by a pulse-width-modulated operating signal, and is part of the circuit arrangement. To generate the operating signal, a microprocessor, a frequency generator and a pulse width modulator, which is acted on by the output signal of the frequency generator and a control signal of the microprocessor, are provided. These components also are used as components of an actuating device to displace a movable part of a sun roof, a changeover signal switching between use for charging a battery and/or powering a fan and use operating the sun roof. Thus, the circuit arrangement is able to fulfill multiple functions.

9 Claims, 2 Drawing Sheets

CIRCUIT ARRANGEMENT FOR POWER SUPPLY OF A FAN AND/OR BATTERY BY SOLAR GENERATOR IN A MOTOR VEHICLE

BACKGROUND OF THE INVENTION

1. Field of the Invention

The invention relates to a circuit arrangement for supplying power to a fan and/or battery by a solar generator in a motor vehicle, with a DC voltage converter using the impedance matching between the solar generator and the fan or the battery. In particular, the invention is directed to such an arrangement in which the converter comprises a switch that is alternately opened and closed by means of a pulse-width-modulated actuating signal.

2. Description of Related Art

Circuit arrangements of the type to which the present invention is directed are known from the magazine article "MPP-Tracking" by Peter Adelmann found at pages 9–11 of the January, 1988 issue of Sonnenenergie [Solar Energy], and from German Patent Application 40 17 670 A. In this case, by impedance matching, the DC voltage converter provides for a power matching of the power consuming device to the solar energy generator. By suitable pulse width modulation of the actuating signal, a so-called MPP tracking (maximum-power-point tracking) is to be achieved as a function of a power measurement, which generally takes place on the input side of the DC voltage converter. These known circuit arrangements require a considerable additional expense if used in motor vehicles.

SUMMARY OF THE INVENTION

The primary object of the invention is, thus to minimize the expenses associated with providing a circuit arrangement for supplying power to a fan and/or battery by a solar generator in a motor vehicle.

Starting from a circuit arrangement of the initially-mentioned type, this object is achieved, according to the invention, by using a microprocessor, a frequency generator and a pulse width modulator acted on by the output signal of the frequency generator and a control signal of the microprocessor, which, as a function of a changeover signal, optionally can also be used as components of an actuating device for displacing an movable part, especially a cover, such as a sun roof, solar roof, sliding-lifting roof, lifting roof or spoiler roof, to generate the pulse-width-modulated actuating signal.

In the arrangement according to the invention, essential parts of the solar power supply can be used repeatedly, so that the expense for the solar power supply is reduced in the case of motor vehicles provided with an electrically displaceable sun roof.

In another configuration of the invention, an end stage is downstream to the pulse width modulator, and can be used optionally either to control the DC voltage converter or the sun roof actuating device.

In addition, a current measuring unit for delivering a current measuring signal to the microprocessor is suitably provided as a function of the current flowing in the end stage when using the end stage both to control the DC voltage converter and the sun roof actuating device. When operating the DC voltage converter, the current measuring signal can be used for current limitation and for short-circuiting control. When operating the sun roof actuating device, on the other hand, the current consumption of the actuating device can be determined by the current measuring signal to detect a jamming of the adjustable sun roof part and/or engine defects.

Preferably, the design of the circuit arrangement is made so that, with use of the pulse width modulator to control the switch of the DC voltage converter, a voltage signal which is a measurement for the output voltage of the DC voltage converter is close to the microprocessor, and that the microprocessor is designed and/or programmed, so that it seeks to maximize the output voltage of the DC voltage converter by changing the control signal directed at the pulse width modulator. In this case, an MPP adjustment does not take place by a power measurement, requiring the determination of current and voltage, on the input side of the DC voltage converter, but simply as a function of a voltage measurement on the output side of the DC voltage converter. As a result, the component expense is kept especially small.

Between the output of the DC voltage converter and the input of the microprocessor receiving the voltage measuring signal, a filter stage, designed, for example, as low-pass filter, can suitably be connected to attenuate or suppress interfering signals superimposed on the voltage signal.

For a temperature compensation of the cutoff voltage of the battery, a temperature sensor can advantageously be provided, which applies a temperature measuring signal to the microprocessor to influence the control signal directed at the pulse width modulator as a function of the ambient temperature or the battery temperature.

The sun roof actuating device is preferably designed as a automatic preselection device in a way known in the art from, for example, U.S. Pat. No. 4,556,835, and which comprises a set-point transmitter with a selector element for positioning of the movable sun roof part and a drive assigned to the movable sun roof part, the drive being part of a control circuit that compares the position selected with the selector element with the actual position of the movable sun roof part, and then adjusts the actual position of the movable sun roof part until the control deviation has become zero.

These and further objects, features and advantages of the present invention will become apparent from the following description when taken in connection with the accompanying drawings which, for purposes of illustration only, show a preferred embodiment in accordance with the present invention.

DETAILED DESCRIPTION OF THE PREFERRED EMBODIMENT

Figure 1:
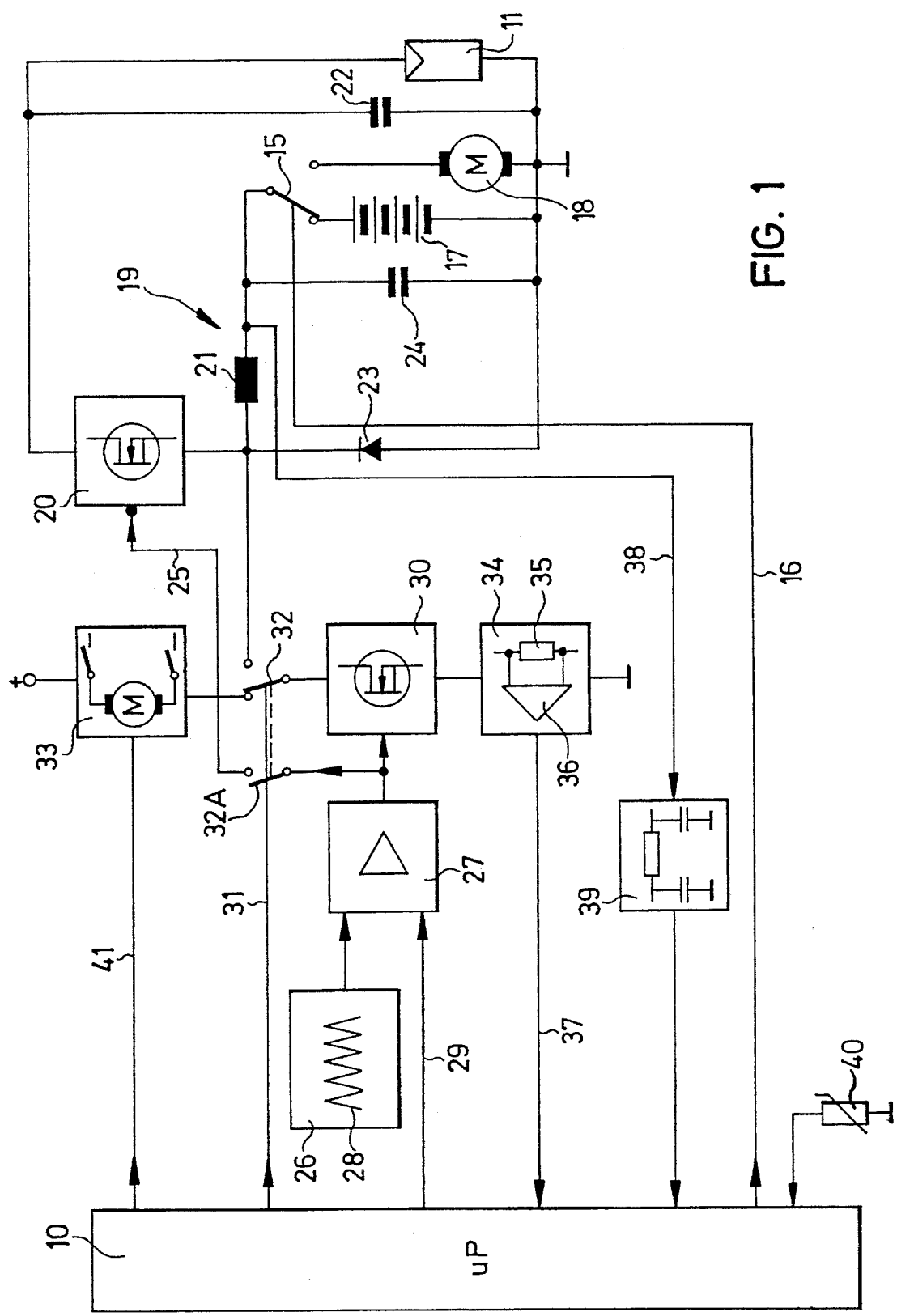
FIG. 1 is a block diagram of the circuit arrangement for solar power supply and for sun roof actuation in accordance with a preferred embodiment of the invention.
Figure 2:
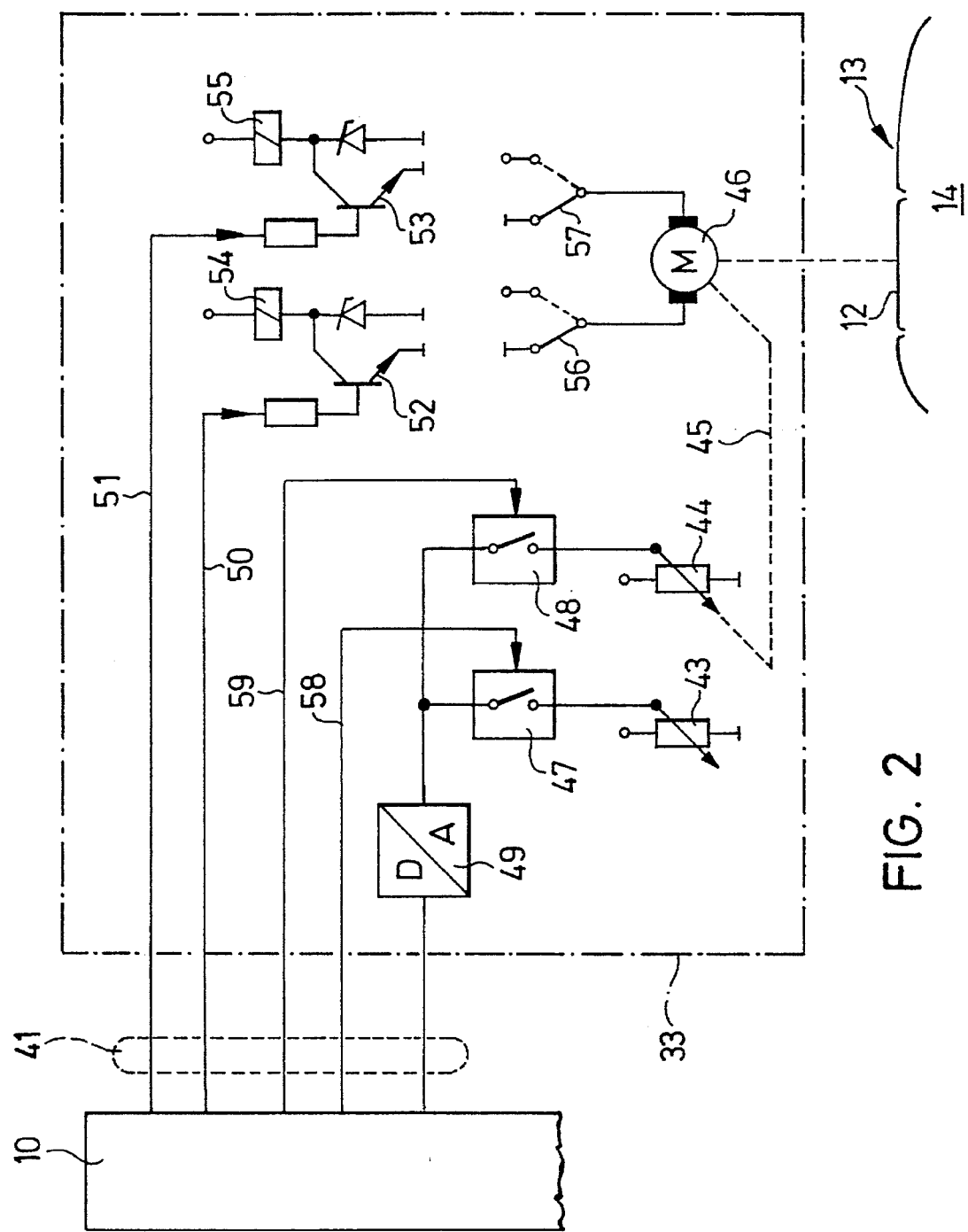
FIG. 2 is a block diagram of a sun roof actuating device designed as a automatic preselection device.

The circuit arrangement according to FIGS. 1 and 2 comprises a microprocessor 10 which can optionally be part of an on-board computer installed anyhow for the motor vehicle. A solar generator is designated with 11. Solar energy generator 11 can be integrated, for example, in a cover 12 (FIG. 2) of a sun roof 13 of a motor vehicle 14. Such solar energy generators are known in various embodiments (e.g., U.S. Pat. No. 5,213,626 and published German Patent Application No. 41 05 396 A), and therefore, the details thereof, by themselves, form no part of this invention and do not require a more detailed explanation. As a function of the position of a changeover switch 15, which is controlled either manually or by the microprocessor 10 via a control signal line 16, the electric energy generated by the solar energy generator 11 is used either to recharge a battery 17 on board motor vehicle 14 or to actuate a fan 18. Battery 17 can be a standard motor vehicle battery or an additional energy storage device.

In a known way, fan 18 can be a standard motor vehicle fan of the vehicle heating/ventilating system (cf., for example, published German Patent Application No. DE 40 17 670 A). But, fan 18 can be, for example, also one or more additional fans, which are arranged in the roof area or in another part in the motor vehicle. For example, it is also possible to bring one or more fans into the system as a function of the measured light intensity. Solutions of this type are likewise known in various forms (U.S. Pat. No. 5,248,278, published German Patent Application No. DE 40 09 871 A and German Patent No. 39 38 259).

A DC voltage converter, in its entirety designated as 19 in FIG. 1, is connected between solar energy generator 11 and both the battery 17 and fan 18. This DC voltage converter 19 is designed, in the illustrated embodiment, as a downconverter or step-down converter, and comprises a switch 20 and a coil 21, which lie in series between solar energy generator 11 and changeover switch 15. Further, a capacitor 22, which is connected on the input side parallel to solar energy generator 11, as well as a circuit made of a diode 23 and a capacitor 24, which is connected on the output side, are part of DC voltage converter 19. For its part, this circuit lies parallel to the series connection formed of the changeover switch 15 and battery 17 or fan 18. In the interest of the fewest possible leakage losses, switch 20 is, advantageously, made of a MOS-FET power transistor with a related driver circuit, in a way known in the art ("MPP-Tracking", Peter Adelmann, Sonnenenergie [Solar Energy] January 1988, pages 9–11). The necessary charging voltage of battery 17 and the operating voltage of fan 18, as a function of the voltage given off by solar energy generator 11, can also be obtained via a DC voltage converter that, optionally, be designed also as an up-converter (step-up converter) or as an inverse converter. These various types of DC voltage converters are, likewise, known in the art ("MPP-Tracking", Peter Adelmann, Sonnenenergie [Solar Energy] January 1988, pages 9–11), and therefore, do not require any discussion in more detail here.

Switch 20 is alternately opened and closed by a pulse-width-modulated actuating signal delivered by a line 25. To generate the pulse-width-modulating actuating signal, a frequency generator 26 and a pulse width modulator 27 are provided. In the illustrated embodiment, frequency generator 26 generates a fixed-frequency triangular signal 28, whose frequency, preferably, lies above the audible range, for example at 20 kHz, to avoid the generation of undesirable interfering noises. Pulse width modulator 27 can be designed simply as a comparator, which compares the output signal of frequency generator 26 with a pulse-width-determining voltage delivered by microprocessor 10 by a line 29. At the output of pulse width modulator 27, the pulse-width-modulated actuating signal appears, which is directed, in an inverted manner, to end stage 30 and directly to switch 20 (as indicated by the point at the input of switch 20).

End stage 30 comprises, as indicated in FIG. 1, preferably, either one or several MOS-FET power transistors. This end stage 30 is used in the operation as a DC voltage converter (switch 32 located to the right) to minimize leakage losses of diode 23 in its conductive state. The output of end stage 30 is connected by a changeover switch 32, 32A, controlled by microprocessor 10 via a control line 31, either with a sun roof actuating device 33 or the DC voltage converter 19. The changeover switch 32 is, preferably, designed as a switching circuit, whereas switch 32A is formed by a logic gate. In the output circuit of end stage 30, there is a current measuring unit 34, which suitably comprises a current measuring resistance 35 and an amplifier stage 36, and which provides a current measuring signal to microprocessor 10 via a line 37.

A signal, characteristic of the output voltage of DC voltage converter 19, passes over a line 38 and via a filter stage 39 to the microprocessor 10. In filter stage 39, in particular, a low-pass filter can be involved, as indicated in FIG. 1. The object of filter stage 39 is to attenuate or to suppress interfering signals superimposed on the voltage measuring signal. Filter stage 39 can, alternatively, also be achieved by a software solution in microprocessor 10. A temperature sensor 40 is connected to another input of microprocessor 10. Sun roof actuating device 33 is controlled by microprocessor 10 and receives signals from it. This is indicated diagrammatically by cable 41 in FIG. 1.

Sun roof actuating device 33 can basically be designed in any known way. Examples of suitable actuating devices can be found from published German Patent Application No. 29 02 683 A and from European Patent No. 0 004 970 B. But, an automatic preselection device, as it is known in the art from the above-mentioned U.S. Pat. No. 4,556,835, is preferably utilized for sun roof actuating device 33. Essential parts of such an automatic preselection device are diagrammatically represented in FIG. 2. These parts include a set-point transmitter 43 designed, for example, as a potentiometer for the target position of cover 12 and an actual value transmitter 44 determining the actual position of cover 12, for which a potentiometer can, likewise, be used. A mechanical connection between actual value transmitter 44 and cover 12 or a drive motor 46 being used to displace the cover is indicated in FIG. 2 at 45. The target and actual position signals coming from potentiometers 43 and 44 are evaluated digitally in the represented embodiment. For this purpose, the outputs of potentiometers 43 and 44 can be connected to an A/D converter 49, which converts the analog position signals to digital signals, by electronic switches 47 and 48 in time multiplexed operation. Microprocessor 10 is acted on with these digital position signals, and performs a comparison of the target and actual positions. In the case of corresponding control deviations, it provides actuating signals to power transistors 52 or 53 via control lines 50 or 51. In each case, a relay 54 or 55 with related relay contacts 56 or 57 lies in the collector-emitter circuit of power transistors 52, 53. Voltage is applied to drive motor 46 by relay contacts 56 and 57, so that, if necessary, it rotates in one or the other direction. Controlling of switches 47 and 48 is produced by microprocessor 10 via the control lines 58 and 59.

If DC voltage converter 19 is actuated by microprocessor 10 via control line 31 and changeover switch 32, the energy supplied by solar energy generator 11 is used as a function of the position of changeover switch 15 to either recharge battery 17 or drive fan 18. In this case, the dependence of input to output voltage of DC voltage converter 19 is determined by the pulse-width repetition ratio of the pulse-width-modulated actuating signal at the output of pulse width modulator 27. If switch 20 is conductive, a magnetic field develops in coil 21. If switch 20 is again nonconductive, coil 21 attempts to continue driving the instantaneous current by diode D. Because of the series connection of coil 21 and the consuming device (battery 17 or fan 18), the output voltage of DC voltage converter 19 is less than its input voltage. In capacitor 22, the input energy accumulating during the nonconductive phase of switch 20 is temporarily stored. Capacitor 24 provides for a smoothing of the output voltage. The pulse duty factor of the actuating signal running over line 25 is adjusted by microprocessor 10 as a function of the voltage measuring signal running over line 38, so that at the output of the DC voltage converter 19, the maximum achievable voltage is constantly generated. This applies both to the operation of fan 18 and to the recharging of the battery 17 up to its cutoff voltage.

Instead of the control signal passing over line 29 in the form of a DC voltage with changeable amplitude, microprocessor 10, itself, can also generate a pulse-width-modulated voltage, which is converted by means of a low pass filter to a pulse-width-proportional DC voltage.

If actuating device 33 is controlled by changeover switch 32 and the switch 32 is designed as an automatic preselection device corresponding to FIG. 2, the driver can set a desired position of cover 12 on set-point transmitter 43. By drive motor 46, cover 12 is then displaced automatically until correspondence between the actual position detected by actual value transmitter 44 and the target position is determined to exist. In the operation of drive motor 46, the operating current is measured by current measuring unit 34. In this way, a jamming of the roof, the squeezing of an object between the fixed roof and the movable cover part, or engine defects can be detected. During operation of DC voltage converter 19, the signal delivered by current measuring unit 34 is used in current limitation and short-circuiting control.

The cutoff voltage of battery 17 can be matched to the respectively prevailing ambient temperature or the battery temperature by temperature sensor 40.

While only a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Circuit arrangement for supplying power to at least one of a fan and a battery by a solar energy generator in a motor vehicle, comprising a DC voltage converter using impedance matching between the solar energy generator and the at least one of the fan and the battery, said converter having a switch that is alternately opened and closed by a pulse-width-modulated actuating signal; wherein means for generating the pulse-width-modulated actuating signal comprises a microprocessor, a frequency generator and a pulse width modulator, the pulse width modulator being connected to an output of the frequency generator for receiving an output signal therefrom and being connected to the microprocessor for receiving a control signal from the microprocessor, and changeover means for enabling said circuit arrangement to selectively form components of an actuating device for changing the position of a movable part of a sun roof instead of supplying power to at least one of the fan and battery.

2. Circuit arrangement according to claim 1, wherein an end stage is downstream of the pulse width modulator, said end stage controlling one of said DC voltage converter and the sun roof actuating device in dependence on said changeover means.

3. Circuit arrangement according to claim 2, further comprising a current measuring unit for delivering a current measuring signal to the microprocessor as a function of current flowing in the end stage.

4. Circuit arrangement according to claim 3, wherein an input of the microprocessor is connected to an output side of the DC voltage converter for receiving a voltage measuring signal which is a measurement of the output voltage of the DC voltage converter; and wherein the microprocessor, as a means of maximizing the output voltage of the DC voltage converter, changes the control signal delivered to the pulse width modulator as a function of said voltage measuring signal.

5. Circuit arrangement according to claim 4, wherein a filter stage, for attenuating or suppressing interfering signals superimposed by the voltage measuring signal, is connected between the output of DC voltage converter and the input of the microprocessor receiving the voltage measuring signal.

6. Circuit arrangement according to claim 4, wherein the end stage is connected in parallel for minimizing leakage losses of a diode forming a part of the DC voltage converter.

7. Circuit arrangement according to claim 2, wherein the sun roof actuating device is an automatic preselection device which comprises a set-point transmitter for providing a signal representing a target position of the movable sun roof part and a drive for displacement of the movable sun roof part, said drive forming part of a control circuit that compares the target position set on the set-point transmitter with the actual position of the movable sun roof part and displaces the movable sun roof part until a control deviation between the target position and the actual position of the movable sun roof part becomes zero.

8. Circuit arrangement according to claim 1, wherein a temperature sensor is connected to the microprocessor as a means for supplying a temperature measuring signal to the microprocessor, said microprocessor being responsive to said temperature measuring signal as a means for varying the control signal delivered to the pulse width modulator as a function of ambient temperature.

9. Circuit arrangement according to claim 1, wherein the sun roof actuating device is an automatic preselection device which comprises a set-point transmitter for providing a signal representing a target position of the movable sun roof part and a drive for displacement of the movable sun roof part, said drive forming part of a control circuit that compares the target position set on the set-point transmitter with the actual position of the movable sun roof part and displaces the movable sun roof part until a control deviation between the target position and the actual position of the movable sun roof part becomes zero.

* * * * *